(12) United States Patent
Muzilla et al.

(10) Patent No.: US 6,315,728 B1
(45) Date of Patent: Nov. 13, 2001

(54) ULTRASOUND COLOR FLOW ADAPTIVE SCANNING TECHNIQUES

(75) Inventors: David John Muzilla, Mukwonago; Theodore Lauer Rhyne, Whitefish Bay, both of WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/468,181

(22) Filed: Dec. 21, 1999

(51) Int. Cl.[7] ....................................................... A61B 8/12
(52) U.S. Cl. ............................................................. 600/454
(58) Field of Search ........................... 600/437, 440–447, 600/449, 451, 453–455

(56) References Cited

U.S. PATENT DOCUMENTS 6,210,335 * 4/2001 Miller .................................. 600/454

* cited by examiner

*Primary Examiner*—Marvin M. Lateef
*Assistant Examiner*—Ali M. Imam
(74) *Attorney, Agent, or Firm*—McAndrews, Held & Malloy, Ltd.; Peter J. Vogel; Michael A. Dellapenna

(57) ABSTRACT

An ultrasound survey frame (SF) is processed in order to determine the portions representing fluid flow. An assembly (20) again rescans only the portions of a subject represented by the portions of the survey frame in which fluid flow was found. Target frames (TF) then are created from the rescanning and are processed in order to provide a color flow image restricted to the portions of the survey frame in which fluid flow is indicated.

10 Claims, 2 Drawing Sheets

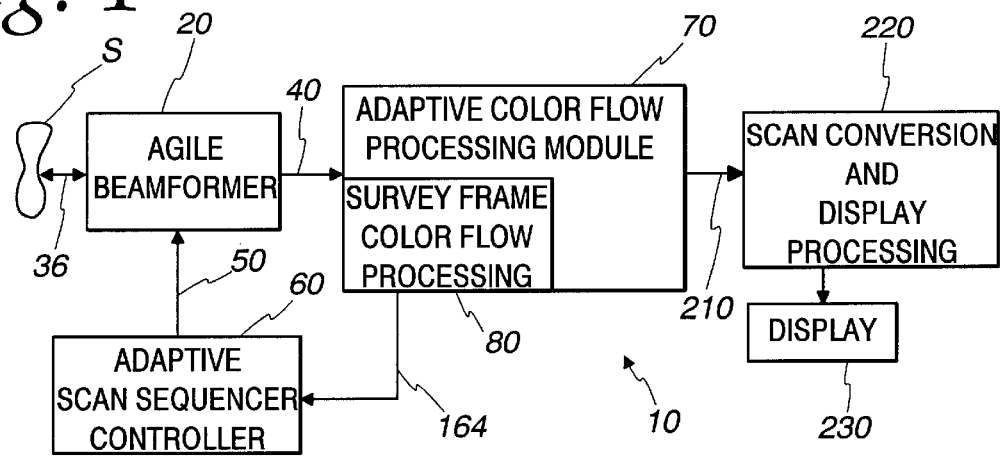
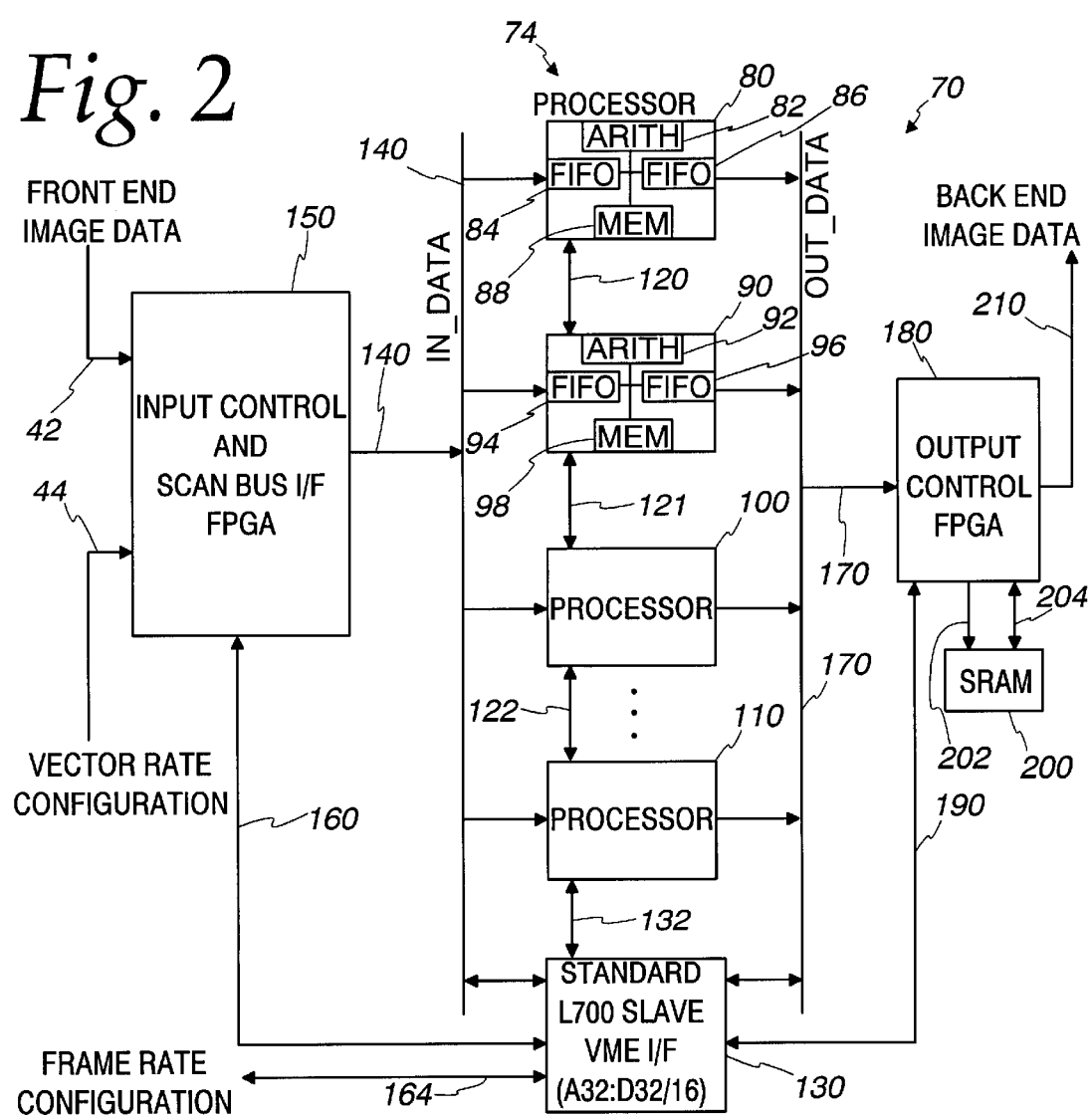

ULTRASOUND COLOR FLOW ADAPTIVE SCANNING TECHNIQUES

BACKGROUND OF THE INVENTION

This invention relates to ultrasound color flow imaging, and more particularly relates to such imaging based on a portion of a subject in which fluid flow is identified.

A conventional ultrasound system typically interleaves B-mode imaging with color flow imaging. The color flow vectors from the color flow imaging are formed over the entire color flow region of interest (ROI) for every acoustic frame. These color flow vectors typically are contained in several interleave groups across the ROI. Every vector position in the color flow ROI is sampled and processed for every acoustic frame before display. As a result, a large amount of processing is required in order to produce a color flow image of the entire region of interest. In addition, a large amount of memory is normally required and a substantial reduction in frame rate may occur. This invention addresses these problems and provides a solution.

BRIEF SUMMARY OF THE INVENTION

The preferred embodiment is useful in an ultrasound imaging system for displaying a color flow image representing at least a portion of a subject being studied. In such an environment, the preferred embodiment transmits ultrasound waves toward a first portion of the subject and receives first reflected ultrasound waves from the first portion. The transmitting and receiving preferably are accomplished with a transducer assembly. A first set of signals is generated having first values related to the velocity components of the fluid flow in the first portion of the subject in response to the first reflected ultrasound waves. The first values are analyzed to identify flow data representing a region of fluid flow within the first portion of the subject. The generating and analyzing preferably is accomplished with a processor. Ultrasound waves are transmitted toward a second portion of the subject and second reflected ultrasound waves are received from the second portion such that the second portion of the subject is smaller than the first portion and includes at least some of the region of fluid flow. The transmitting toward the second portion preferably is accomplished with the transducer assembly. A second set of signals is generated having second values related to velocity components of the fluid flow in the second portion of the subject in response to the second reflected ultrasound waves. The second scan values are processed to generate processed color flow data for display as a color flow image. The generating of the second set of signals and the processing preferably are done with the processor. A color flow image is displayed in response to the processed color flow data.

By using the foregoing techniques, the tissue interrogation and/or color flow processing required in a clinical examination may be substantially reduced. A reduction in interrogation and/or processing may be used in various ways to increase the average acoustic frame rate, improve color flow sensitivity and resolution, reduce processing and memory loads and increase color flow regions of interest without unduly sacrificing frame rate.

BRIEF DESCRIPTION OF THE DRAWINGS

FIG. 1 is a schematic block diagram of a preferred form of apparatus made in accordance with the present invention.

FIG. 2 is a schematic block diagram showing in more detail a portion of the apparatus as shown in FIG. 1.

DETAILED DESCRIPTION OF THE INVENTION

Figure 3:
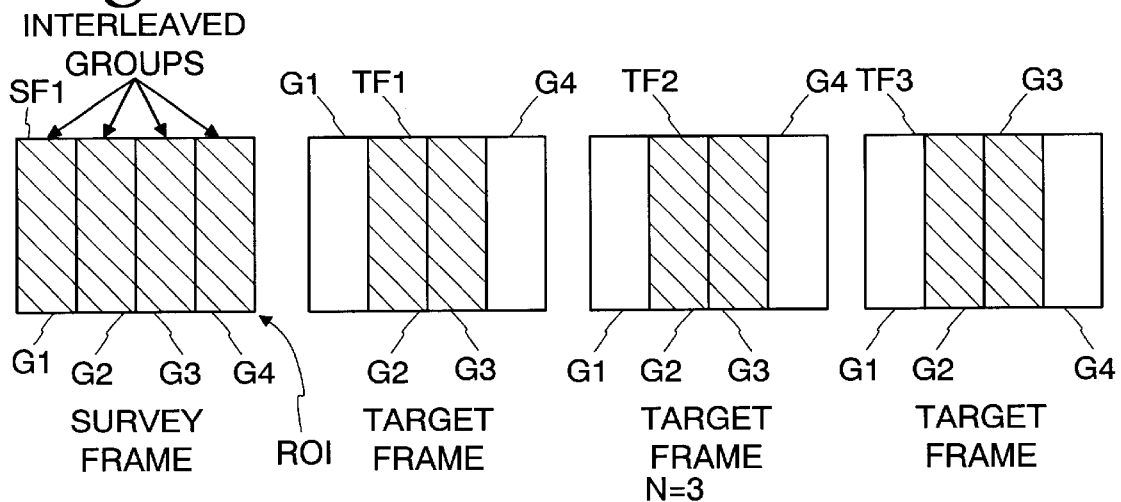
FIG. 3 is a schematic diagram illustrating the division of a survey frame over a region of interest and target frames which contain data indicative of fluid flow.

Referring to FIG. 1, a preferred form of the invention comprises an imaging system 10 for displaying a color flow image of a subject S being studied. System 10 includes a transducer and agile beam former assembly 20 of the type described in U.S. Pat. No. 5,653,236 (Miller, issued Aug. 5, 1997) (the "'236 Patent"). Assembly 20 transmits ultrasound waves toward a controllable portion of subject S along an axis 36 and receives reflected ultrasound waves from the portion along the same axis 36 in the manner described in the '236 Patent. Assembly 20 generates signals in response to the reflected ultrasound waves which are transmitted over a bus 40 to an adaptive color flow processing module 70. The direction of axis 36 is controlled by control signals received over a bus 50 from an adaptive scan sequencer controller 60. Controller 60 controls the angle of axis 36 in the manner described in the '236 Patent.

Referring to FIGS. 1 and 2, processing module 70 comprises a processor unit 74 which may include one or more individual processors. For example, processor unit 74 may include a survey frame processor 80 comprising an arithmetic unit 82, FIFO units 84 and 86 and a memory 88 connected as shown. Processor unit 74 also may comprise a target frame processor 90 comprising an arithmetic unit 92, FIFO units 94 and 96 and a memory 98 connected as shown. Processor unit 74 also may include other processors, such as processors 100 and 110, which are identical to processor 80. Each of processors 80, 90, 100, and 110 may comprise a digital signal processor, such as model TMS 320C6201 manufactured by Texas Instruments. The processors shown in FIG. 2 are interconnected by communication busses 120–122, and processor 110 communicates with a standard logic 700 slave VME interface (I/F) 130 over a communication bus 132.

Processor unit 74 receives data over an input bus 140 from an input control and scan bus interface (I/F) 150 which comprises a field programmable gate array (FPGA). Interface 130 communicates with interface 150 over a communication bus 160. In addition, interface 130 provides output signals over a bus 164 to controller 60 (FIG. 1).

Processor unit 74 provides output data on an output bus 170 to an output control unit 180 which comprises a field programmable gate array (FPGA). Control unit 180 communicates with interface 130 over a communication bus 190 reads and writes data to and from an SRAM memory 200 over busses 202 and 204. Control unit 180 provides color flow data for display over an output bus 210 to a conventional scan conversion and display processing unit 220 (FIG. 1). The color flow data is converted to a corresponding image created on a display 230.

Referring to FIGS. 1–3, processor 80 issues a command which results in a signal transmitted over bus 164 to controller 60 that results in assembly 20 transmitting ultrasound waves toward a region of interest (ROI) of subject S and receiving reflected ultrasound waves from the ROI. The reflected waves are processed by processor 80 into a survey frame SF1 (FIG. 3) which includes four equally sized interleaved groups of data G1–G4 stored in memory 88. Processor 80 processes the data in groups G1–G4 and determines that only the data in groups G2 and G3 result from fluid flow in the ROI. As a result, processor 80 issues another command which results in a second signal transmitted over bus 164 to controller 60 that causes assembly 20 to again transmit a second group of ultrasound waves toward the portions of subject 80 that resulted in data groups G2 and G3 in frame SF1.

As can be seen from FIG. 3, the portion of the subject scanned by the second group of ultrasound waves is substantially smaller than the ROI portion of the subject indicated in frame SF1. The data resulting from the second group of reflected ultrasound waves is transmitted to the target frame processor 90 which color flow processes only the data resulting from groups G2 and G3 as shown in FIG. 3. As shown in FIG. 3, target frames TF1–TF3 include only data groups G2 and G3, whereas survey frame SF1 includes not only data groups G2 and G3, but also data groups G1 and G4.

Processor 90 processes the data on bus 140 resulting from the second group of reflected ultrasound waves to form target frame groups G2 and G3 which include a set of signals having values related to the velocity components of the fluid flow in the portion of subject S represented by data groups G2 and G3. Data in groups G2 and G3 is color flow processed by processor 90 to generate color flow data which is transmitted over output bus 170 to control unit 180 which, in turn, transmits color flow data over bus 210 to scan conversion and display processing unit 220. By well known means, unit 220 displays the resulting color flow images on display unit 230. Since only the portion of the ROI represented by data groups G2 and G3 are scanned by assembly 20 and processed by processor 90, they're typically is time for more target frames than survey frames. As a result, FIG. 3 shows target frames TF1–TF3 resulting from a single survey frame SF1.

If all four frames, SF1 and TF1–TF3, were scanned and processed in their entirety according to conventional color flow techniques, the scanning and processing load would be 100%. However, with the example shown in FIG. 3, only half of the vectors in each target frame need to be scanned, sampled and processed. This corresponds to a scanning and processing load of only 62.5% for a potential savings of 37.5%. The extra frame rate achieved by the technique shown in FIG. 3, could be accepted or the packet size and/or vector density could be increased to achieve more color flow sensitivity and resolution. The survey and target frames shown in FIG. 3 are continuously repeated during scanning of subject S as long as the described conditions remain the same.

Figure 4:
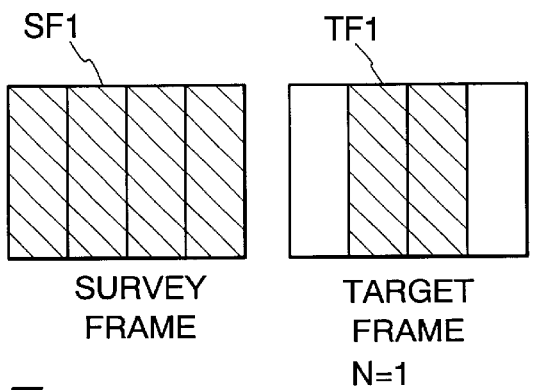
FIG. 4 is a schematic diagram illustrating a reduction in the number of target frames compared to the illustration of FIG. 3.

Referring to FIG. 4, if the average acoustic frame rate were significantly lower, or if the flow state were changing significantly faster than in the FIG. 3 example, the number of target frames may need to be reduced to, for example, only a single target frame TF1 as shown in FIG. 4. For the case shown in FIG. 4, the scanning and processing load would be reduced to 75%, for a potential savings of 25%.

The examples of FIGS. 3 and 4 illustrate an ideal situation in which fluid flow corresponds exactly to the vectors within interleave groups G2 and G3. In the most general implementation of the preferred embodiment, the target frame firing decisions could be made on a vector-by-vector basis. In the examples of FIGS. 3 and 4, the target frame scanning decisions are constrained to interleave groups (e.g., either scan and process an interleave group, such as group G2, or none of the group). Scanning and processing limited to entire interleave groups (e.g., group G2) would be easier to implement, but would not, in general, yield significant improvements as often as decisions made on a vector-by-vector basis.

Figure 5:
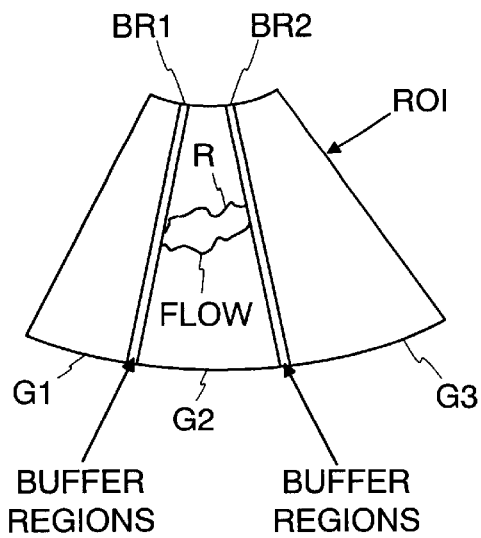
FIG. 5 is a schematic illustration of a target frame with adjacent buffer vectors and regions.

Referring to FIG. 5, buffer flow vectors may be added in buffer regions, such as BR1 and BR2, in order to make the preferred embodiment more robust and less sensitive to motion. For example, in a region of interest including data groups G1, G2, and G3 as shown in FIG. 5, buffer regions BR1 and BR2 may lie on either side of a region R in which fluid flow occurs. More generally, for every vector determined to have flow on a survey frame, some number, b, of adjacent buffer vectors might also be fired and sampled on target frames. This procedure minimizes the reduced sampling benefit on a given target frame, but improves over-all imaging performance. As shown in FIG. 5, buffer vectors are illustrated on either side of the fluid flow region R to create two buffer regions BR1 and BR2 of extra vectors that are scanned, sampled and processed in a target frame consisting of group G2 by processor 90. As shown in FIG. 5, the target frame would include only a data group G2 and buffer regions BR1 and BR2.

Figure 6:
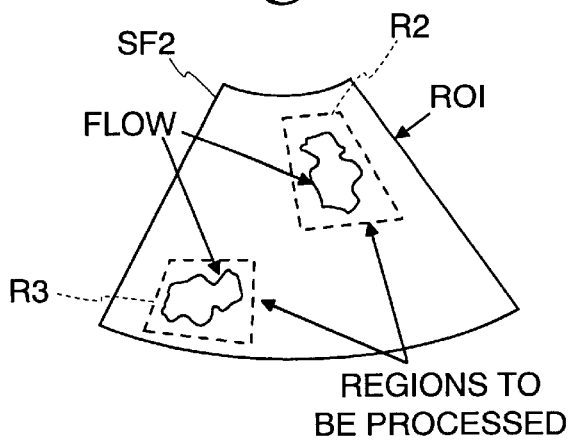
FIG. 6 is a schematic illustration of a target frame in which only regions including flow data are subjected to color flow processing.

Referring to FIG. 6, according to the preferred embodiment, the efficiency of the system may be further improved by selectively processing only those vector range samples in which flow is known to exist. In this way, the survey frame provides range intervals over which flow is detected, and the target frame provides adaptive color flow processing for only those range intervals. Such a procedure does not increase the frame rate, but reduces the color flow processing load in the range dimension as well as in the lateral dimension, as a function of the amount of flow in the ROI. This reduced processing load can be traded off against reduced hardware costs, covering a wider ROI, or using the processing hardware assets of the imager to provide improved color flow performance (e.g., better detection, better resolution, etc.).

Still referring to FIG. 6, processor 80 processes survey frame SF2 with a color flow processing algorithm which identifies pixels having valid color flow information and sets up a region around these pixels on which parameter estimation and other color flow processing functions are performed on subsequent target frames. Pixel location in R-theta space is managed for subsequent scan version. In addition, an adequate buffer area, such as buffer regions BR1 and BR2 shown in FIG. 5, may be incorporated into the regions to be processed in FIG. 6 for the purpose of making the mechanization less sensitive to motion.

Still referring to FIG. 6, the entire region of interest (ROI) is scanned by assembly 20 and the resulting reflected ultrasound waves are processed by processor 80 in order to form a survey frame SF2. Processor 80 identifies regions R2 and R3 as the only regions in which fluid flow data exists. As a result, processor 80 sends a signal over bus 164 to controller 60 that causes assembly 20 to again scan the subject only in regions R2 and R3. The resulting reflected ultrasound waves from regions R2 and R3 are processed by processor 90 into corresponding target frames. Adaptive color flow processing is only performed on the data resulting from regions R2 and R3 so that only regions R2 and R3 result in a color flow image on display 230. However, since regions R2 and R3 are much smaller than the entire region of interest, additional target frames may be processed for each survey frame or the data may be manipulated in the ways previously described in order to take advantage of the reduced processing time required for regions R2 and R3.

Those skilled in the art will recognize that only the preferred embodiments have been described in connection with FIGS. 1–6, and that those embodiments may be altered and modified without departing from the true spirit and scope of the invention as defined in the accompanying claims. For example, processors 80 and 90 may be combined into a single processor, such as a single digital signal processor or microprocessor. In addition, all of the processors 80, 90, 100 and 110 may be combined into a single processor, such as a digital signal processor or a microprocessor.

What is claimed is:

1. In an ultrasound imaging system for displaying a color flow image representing at least a portion of a subject being studied, improved apparatus comprising in combination:

a transducer assembly operable in response to a first command for transmitting ultrasound waves toward a first portion of the subject and receiving first reflected ultrasound waves from the first portion and operable in response to a second command for transmitting ultrasound waves toward a second portion of the subject and receiving second reflected ultrasound waves from the second portion;

a processor connected to generate the first command, to generate a first set of signals having first values related to fluid flow in said first portion of the subject in response to the first reflected ultrasound waves, to analyze the first values to identify flow data representing a region of fluid flow within the first portion of the subject, to generate said second command such that the second portion of the subject is smaller than the first portion and includes at least some of the region of fluid flow, to generate a second set of signals having second values related to fluid flow in said second portion of the subject in response to the second reflected ultrasound waves and to process the second values to generate processed color flow data for display as a color flow image; and a display displaying a color flow image in response to said processed color flow data.

2. Apparatus, as claimed in claim 1, wherein said processor generates multiple second commands for each generation of said first command.

3. Apparatus, as claimed in claim 1, wherein said first portion is divided into a plurality of subportions and wherein said processor generates said second command so that the second portion includes the subportions containing any of said region of fluid flow.

4. Apparatus, as claimed in claim 1, wherein said second portion includes the region of fluid flow and a buffer region adjacent said region of fluid flow.

5. Apparatus, as claimed in claim 1, wherein said processor analyzes the second values to identify second flow data representing a region of fluid flow within the second portion of the subject and processes with adaptive color flow processing only the second flow data, so that the color flow data represents only the region of fluid flow within the second portion of the subject.

6. In an ultrasound imaging system for displaying a color flow image representing at least a portion of a subject being studied, a method comprising in combination:

transmitting ultrasound waves toward a first portion of the subject and receiving first reflected ultrasound waves from the first portion;

generating a first set of signals having first values related to fluid flow in said first portion of the subject in response to the first reflected ultrasound waves;

analyzing the first values to identify flow data representing a region of fluid flow within the first portion of the subject;

transmitting ultrasound waves toward a second portion of the subject and receiving second reflected ultrasound waves from the second portion such that the second portion of the subject is smaller than the first portion and includes at least some of the region of fluid flow;

generating a second set of signals having second values related to fluid flow in said second portion of the subject in response to the second reflected ultrasound waves;

processing the second scan values to generate processed color flow data for display as a color flow image; and displaying a color flow image in response to said processed color flow data.

7. A method, as claimed in claim 6, wherein said generating a second set of signals comprises generating multiple second sets of signals for each generating of said first sets of signals.

8. A method, as claimed in claim 6, wherein said first portion is divided into a plurality of subportions and wherein said second portion includes the subportions containing any of said region of fluid flow.

9. A method, as claimed in claim 6, wherein said second portion includes the region of fluid flow and a buffer region adjacent said region of fluid flow.

10. A method, as claimed in claim 6, wherein said processing comprises processing the second scan values to identify second flow data representing a region of fluid flow within the second portion of the subject and processing with adaptive color flow processing only the second flow data, so that the color flow data represents only the region of fluid flow within the second portion of the subject.

* * * * *